(No Model.) 3 Sheets—Sheet 1.

G. F. SIMONDS.
BALL BEARING.

No. 434,482. Patented Aug. 19, 1890.

(No Model.) 3 Sheets—Sheet 3.

G. F. SIMONDS.
BALL BEARING.

No. 434,482. Patented Aug. 19, 1890.

Witnesses:
J. A. Rutherford.
Robert Lovett.

Inventor:
George Frederick Simonds
By James L. Norris.
Attorney

UNITED STATES PATENT OFFICE.

GEORGE FREDERICK SIMONDS, OF FITCHBURG, MASSACHUSETTS.

BALL-BEARING.

SPECIFICATION forming part of Letters Patent No. 434,482, dated August 19, 1890.

Application filed May 19, 1890. Serial No. 352,378. (No model.)

*To all whom it may concern:*

Be it known that I, GEORGE FREDERICK SIMONDS, engineer, a citizen of the United States, and a resident of Fitchburg, Massachusetts, have invented certain new and useful Improvements in Ball-Bearings, of which the following is a specification, reference being had to the accompanying drawings.

My invention relates to bearings in which spherical rollers or balls are employed to diminish the friction.

My said invention is designed to improve the construction of bearings of this kind or class wherein some of the balls bear against and roll upon concentric surfaces for the purpose of supporting radial pressure and the remainder of the said balls bear against and roll upon plane surfaces for the purpose of resisting thrust or end pressure.

One feature of my present invention is the construction of the bearing with a box or casing, within which the balls and other parts are arranged and in the ends of which are secured suitable devices whereby the whole of the parts are held together, thus forming a complete device ready for application to a shaft, axle, wheel, or other body, in or upon which it is to be used.

I make my improved bearing with one or more rings or annular or tubular pieces or sleeves, which are secured upon the shaft or axle and around which the balls are arranged, and with a box or casing which incloses the said balls and the rings or sleeves and which has screw-threaded rings or other suitable devices secured in its ends for the purpose above specified.

Another feature of my said invention is the combination of rings or sleeves provided with external circumferential projections, ribs, or collars, a box or casing having an internal circumferential projection, rib, or collar, which extends into the space between the ribs or collars on the said rings or sleeves, balls arranged to bear against and roll upon concentric surfaces on the said rings or sleeves and box or casing, balls arranged to bear against and roll upon parallel plane surfaces on the said ribs or collars and screw-threaded rings or other suitable devices for closing the annular spaces between the said rings or sleeves and the box or casing at the ends thereof and for securing together the parts of the bearing.

In the accompanying drawings I have shown how my said invention may be conveniently and advantageously carried into practice.

Figure 1:
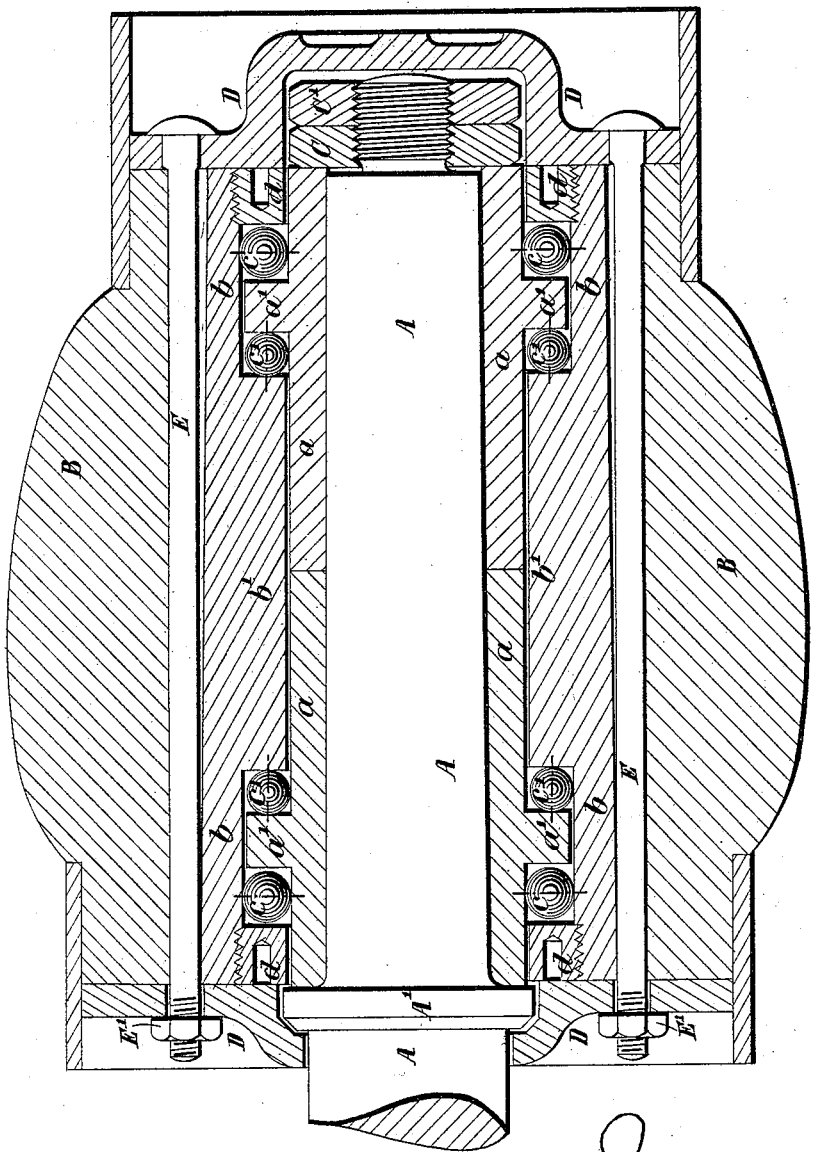
Figure 2:
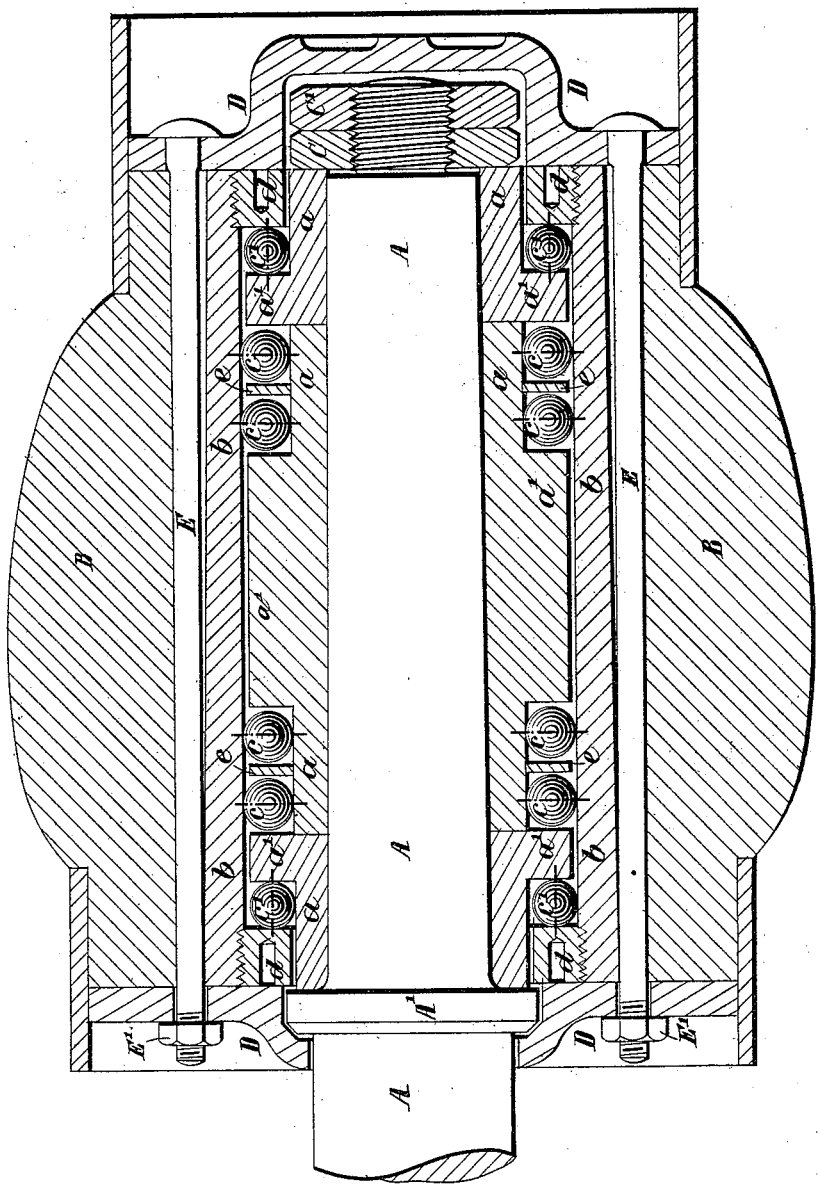
Figure 3:
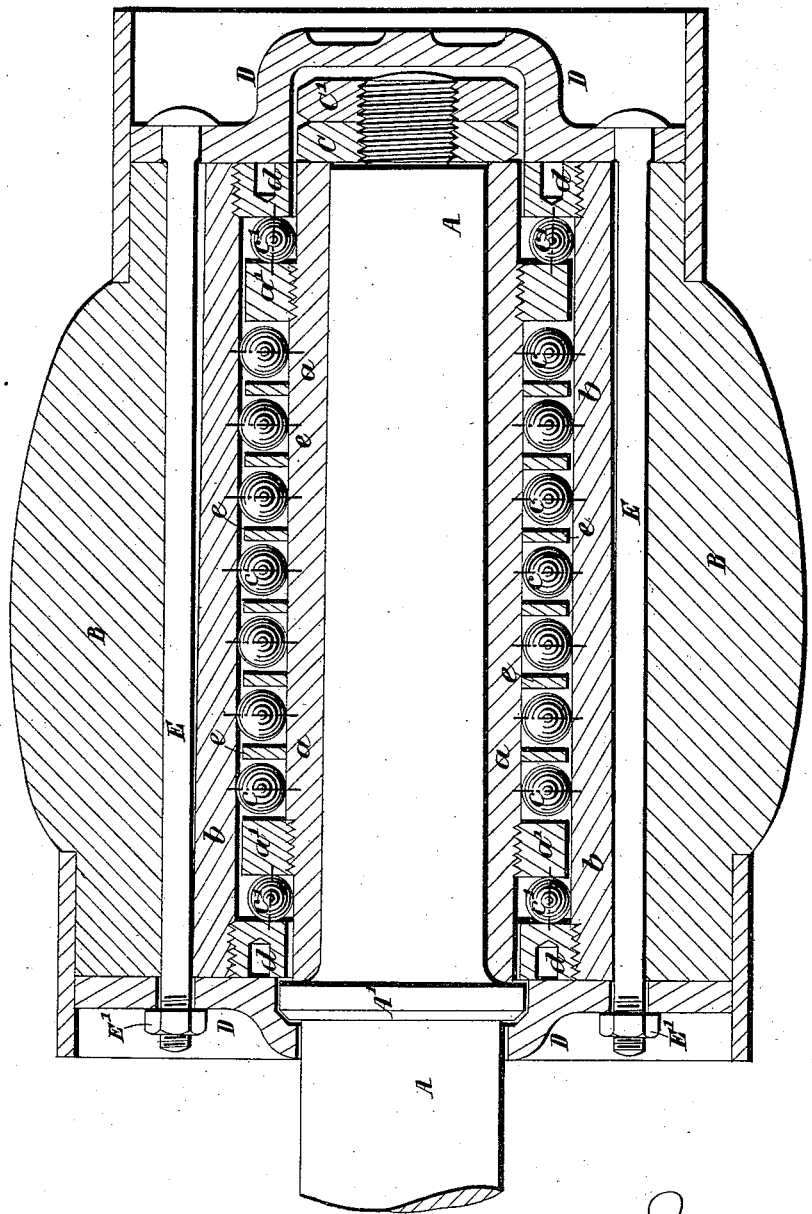

Figure 1 is a longitudinal central section illustrating one form of my improved ball-bearing. Fig. 2 is a similar view illustrating another form or modification of the said ball-bearing, and Fig. 3 is a similar view illustrating a further modification thereof.

Like letters indicate corresponding parts throughout the drawings.

A is a shaft or axle, which is provided with a collar A'.

B is the nave or hub of a wheel.

$a\ a$ are the rings, sleeves, or annular or tubular pieces, which are secured upon the shaft or axle A by means of nuts C C' or in any other convenient manner, and each of which is provided with one or more external circumferential projections, ribs, or collars $a'$.

$b$ is the box or casing surrounding and concentric with the rings or sleeves $a$. $c\ c'$ are the balls, which are arranged in annular spaces between the said rings or sleeves $a$ and box or casing $b$.

D D are covers or end pieces, which are secured at each end of the nave or hub B by means of screw-bolts E, passed through them and through the said nave or hub and provided with nuts E'

In the bearing shown in Fig. 1 the box or casing $b$ is provided with an internal circumferential projection, rib, or collar $b'$, which extends into the space between the ribs or collars $a'$. The said ribs or collars $a'\ b'$ are provided with plane surfaces parallel to each other and perpendicular to the axis of the shaft or axle A. The balls $c'$, for resisting thrust or end pressure, are arranged in circular series or groups between the said plane surfaces on the ribs or collars $a'\ b'$. The balls $c$, for supporting the shaft or axle, are arranged in circular series or groups—one at each end of the bearing—between concentric surfaces on the rings or sleeves $a$ and box or casing $b$. Screw-threaded rings $d$ are fitted and secured in the ends of the box or casing $b$ to close the annular spaces between the rings or sleeves $a$ and the said box or casing at the ends thereof, and thus retain the balls $c$ in place. It will be seen, moreover, that these rings $d$ secure together the parts of the bearing in such a manner that, while the box or casing $b$ is free to rotate relatively to the rings or sleeves $a$, or vice versa, the whole of the parts are held together and form a complete device which can be sold as an article of commerce, and can be readily applied to a shaft or axle, or inserted into the central hole in the nave or hub of a wheel, or introduced into any other place where it is to be used.

In the bearing shown in Fig. 2 there are three rings or sleeves $a$, each provided with an external circumferential rib or collar $a'$. The balls $c'$, for resisting thrust or end pressure, are arranged between the rings $d$ and the ribs or collars $a'$ of the rings or sleeves $a$ at the ends of the bearing. At each end of the rib or collar $a'$, on the middle ring or sleeve $a$, are arranged circular series or groups of balls $c$, for supporting the shaft or axle. These balls are arranged to bear against and roll upon concentric surfaces on the box or casing $b$ and on the middle ring or sleeve $a$, and the series or groups of the said balls are separated by rings $e$, fitted upon the said sleeve $a$.

In the bearing shown in Fig. 3 there is a single tubular piece or sleeve $a$, which has two ribs or collars $a'$. The balls $c'$ are arranged between these ribs or collars and the rings $d$. The balls $c$ are arranged between the said ribs or collars $a'$ in circular series or groups, which are separated from each other by rings $e$.

It is obvious that the construction of my improved bearing may be somewhat modified, if desired, without departing from the nature of my said invention. For instance, other suitable devices may be substituted for the rings $d$ for closing the annular spaces between the rings or sleeves and box or casing at the ends thereof. Any other desired number of rings or sleeves and series or groups of balls may be arranged within the box or casing, and the balls $c\ c'$ may be otherwise arranged, if desired. Moreover, the rings $d$, instead of being screw-threaded, may be provided with any other suitable means for securing them in the ends of the said box or casing, and my improvements are obviously applicable to bearings for car-axles and to bearings for various other purposes.

Certain features of construction shown and described in this application, but not claimed herein, are shown, described, and claimed in applications Serial No. 336,403, filed January 9, 1890, and Serial Nos. 353,086 and 353,087, filed May 24, 1890, and Serial No. 331,639, filed November 26, 1889.

What I claim is—

1. A bearing wherein balls for supporting a shaft, axle, or other body, and balls for resisting thrust or end pressure are arranged between a box or casing and rings or sleeves concentric therewith, and all the parts of which are secured together in such a manner that they form a complete device ready for application to a shaft, axle, wheel, or other body in or upon which it is to be used.

2. In a ball-bearing, the combination of rings or sleeves provided with external circumferential projections, ribs, or collars, a box or casing surrounding the said rings or sleeves and having an internal circumferential projection, rib, or collar which extends into the space between the ribs or collars on the said rings or sleeves, balls arranged to bear against and roll upon concentric surfaces on the said rings or sleeves and box or casing, and balls arranged to bear against and roll upon parallel plane surfaces on the said ribs or collars of the box or casing and of the rings or sleeves, and rings for closing the annular spaces between the said rings or sleeves and the box or casing at the ends thereof, substantially as and for the purposes set forth.

3. In a ball-bearing, the combination of rings or sleeves $a$, a box or casing $b$, surrounding the same, balls $c$, arranged between the said rings or sleeves and box or casing for supporting the shaft or axle, balls $c'$ also arranged between the said rings or sleeves and box or casing for resisting thrust or end pressure, and means, substantially such as above described, for retaining the said rings or sleeves and balls in place within the said box or casing, substantially as and for the purposes set forth.

In testimony whereof I have hereunto signed my name in the presence of two subscribing witnesses.

GEORGE FREDERICK SIMONDS.

Witnesses:
R. J. HEMMICK,
WALTER A. SIMONDS.